Aug. 1, 1939.                F. S. HILL                2,167,754
                         ROTARY BEET TOPPER
                         Filed Feb. 28, 1938
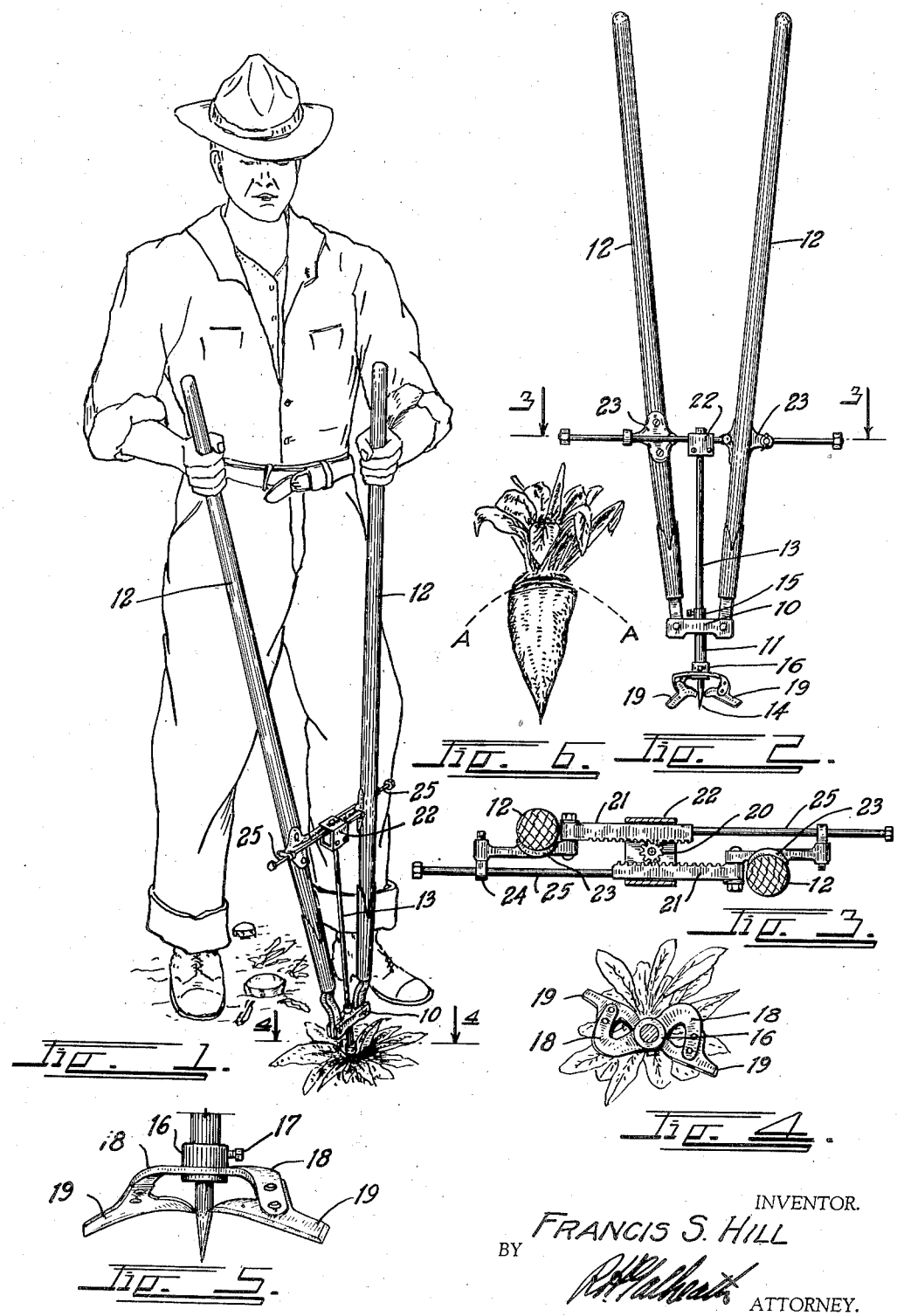
INVENTOR.
FRANCIS S. HILL
BY
                      ATTORNEY.

Patented Aug. 1, 1939

2,167,754

UNITED STATES PATENT OFFICE 2,167,754

ROTARY BEET TOPPER

Francis S. Hill, Denver, Colo.

Application February 28, 1938, Serial No. 192,953

8 Claims. (Cl. 55—65)

This invention relates to a device for topping sugar beets and is designed more particularly as an improvement over the device shown in applicant's prior Patent No. 1,971,611.

The principal object of the invention is to provide a hand operated device by means of which the top can be quickly and easily removed from a sugar beet while the latter is in the ground, and which will shear off the sides around the top so as to remove all leaves and shoots with a minimum removal of beet pulp.

A further object is to provide guiding and holding means which will locate and hold the topper on the beet until the topping operation is complete.

Other objects and advantages reside in the detail construction of the invention, which is designed for simplicity, economy, and efficiency. These will become more apparent from the following description.

In the following detailed description of the invention reference is had to the accompanying drawing which forms a part hereof. Like numerals refer to like parts in all views of the drawing and throughout the description.

In the drawing:

Fig. 1 illustrates the device in use.

Fig. 2 is a side view of the improved beet topper.

Fig. 3 is a horizontal section thereto taken on the line 3—3, Fig. 2.

Fig. 4 is a horizontal section taken just above the knives on the line 4—4, Fig. 1.

Fig. 5 is a detail side view of the knife portion of the device.

Fig. 6 is a diagrammatical view of a typical beet illustrating the position of the cut made by this topper.

The improved topper employs a horizontal frame member 10 to which a vertical tube 11 is affixed. A pair of handles 12 are pivoted to the extremities of the frame member 10 and extended upwardly therefrom. A vertical knife shaft 13, extends downwardly through the tube 11 and terminates in a pointed extremity 14, adapted to be inserted in the beet to be topped.

The rod 13 is free to rotate in the tube 11 but is prevented from moving downwardly therein by means of a set collar 15 and is prevented from moving upwardly therein by means of a knife sleeve 16. The sleeve 16 is locked to the rod 13 by means of a suitable set screw 17. The collar 15 is locked to the rod 13 by means of a similar set screw. The yoke collar 16 carries a pair of arcuate knife arms 18, each of which carries a curved knife blade, 19.

Adjacent its upper extremity, the rod 13 is provided with a gear pinion 20. The pinion 20 is rotated by means of a pair of toothed rack bars 21 which slide through a guide frame 22. The rack bars are hinged by means of hinge bolts 26 upon bracket members 23 which are permanently secured to the handles 12. These bracket members also carry rotatable eye members 24 on the bracket members 23, through which guide rods 25 slide. The eye members act to hold the rack bars against opposite sides of the gear 20. The guide frame also serves to maintain the racks in mesh with the gear. The guide rods are formed on and act as an extension of the rack bars 21.

When the handles are spread apart, the rack bars swing about their hinge bolts 26, and the guide bars pivot at and slide through the eye members. The pivot bolts and the eye members both move slightly downward with the arcuate swing of the handles so that the racks bars remain practically horizontal, but move slightly downward as a unit. The guide frame 22 is sufficiently deep; and the pinion is sufficiently long to accommodate this downward movement.

In use, the operator spreads the handles 12 then drops the device upon a beet so that the point 14 of the rod 13 will enter the approximate center of the beet. He then forces the handles together which acts to spin the knives 19 about the rod 13 causing the knives to shear off the top of the beet leaving the latter with convex top. The position of the cut on the beet is indicated in Fig. 6 by the broken line A—A.

The usual beet topper makes a straight cut across the top of the beet, and in order to cut off the side leaves, which sometimes grow well down along the beet top, it is necessary to sacrifice considerable beet pulp above the cut, which results in a very great loss per acre in the beets.

The blades are designed to cut the beet straight across the top for a width of approximately two inches. This is sufficient to remove the deep growing middle crown of leaves. The blades then curve downwardly to round off the sides of the large beets to remove any side shoots or leaves with a minimum of removal of pulp below the crown. This is illustrated in Figs. 2 and 5 by the flat portions of the blades adjacent the locating pin 14. To remove the side shoots and leaves from a large beet with a straight cut, it is necessary to cut away from two to four inches of the beet top, all of which can be saved by the use of the present invention.

While a specific form of the improvement has been described and illustrated herein, it is desired to be understood that the same may be varied, within the scope of the appended claims, without departing from the spirit of the invention.

Having thus described the invention, what is claimed and desired secured by Letters Patent is—

1. A beet topper comprising: a vertical guide rod having a pointed lower extremity; knives secured to the lower extremity of said rod so as to rotate about said pointed extremity, said knives being so curved and shaped as to form a complete concave cutting unit; and means for rotating said knives.

2. A hand operated beet topping device comprising: a vertically positioned rotatable shaft; a pointed lower extremity on said shaft; knife arms extending oppositely outward adjacent the pointed extremity of said shaft; means for securing said arms to said shaft; a curved knife blade secured on each knife arm, the curve in said blades positioning their axial extremities at a higher elevation than their peripheral extremities; and means for rotating said shaft.

3. A hand operated beet topping device comprising: a vertically positioned rotatable shaft; a pointed lower extremity on said shaft; knife arms extending oppositely outward adjacent the pointed extremity of said shaft; means for securing said arms to said shaft; a curved knife blade secured on each knife arm, the curve in said blades positioning their axial extremities at a higher elevation than their peripheral extremities; a frame member in which said shaft is rotatably mounted; a handle hinged to said frame member at each side of and extending upwardly along said shaft; a rack bar hinged to each handle and extending toward the opposite handle; means on the opposite handle for supporting the free extremities of said rack bars; and a gear on said shaft positioned between said rack bars.

4. A hand operated beet topping device comprising: a vertically positioned rotatable shaft; a pointed lower extremity on said shaft; knife arms extending oppositely outward adjacent the pointed extremity of said shaft; means for securing said arms to said shaft; a curved knife blade secured on each knife arm, the curve in said blades positioning their axial extremities at a higher elevation than their peripheral extremities; a frame member in which said shaft is rotatably mounted; a handle hinged to said frame member at each side of and extending upwardly along said shaft; a rack bar hinged to each handle and extending toward the opposite handle; means on the opposite handle for supporting the free extremities of said rack bars; a gear on said shaft positioned between said rack bars; a guide frame mounted on said shaft about said gear and enclosing said rack bars to maintain them in mesh with said gear.

5. A hand operated beet topping device comprising: a vertically positioned rotatable shaft; a pointed lower extremity on said shaft; knife arms extending oppositely outward adjacent the pointed extremity of said shaft; means for securing said arms to said shaft; a curved knife blade secured on each knife arm, the curve in said blades positioning their axial extremities at a higher elevation than their peripheral extremities; a frame member in which said shaft is rotatably mounted; a handle hinged to said frame member at each side of and extending upwardly along said shaft; a sack bar hinged to each handle and extending toward the opposite handle; guide rods extending from the free extremities of said rack bars; an eye member pivoted on each handle for receiving the guide rod from the opposite handle to maintain the two rack bars parallel; and a gear on said shaft positioned between the rack bars.

6. A hand operated beet topping device comprising: a vertically positioned rotatable shaft; a pointed lower extremity on said shaft; knife arms extending oppositely outward adjacent the pointed extremity of said shaft; means for securing said arms to said shaft; a curved knife blade secured on each knife arm, the curve in said blades positioning their axial extremities at a higher elevation than their peripheral extremities; a frame member in which said shaft is rotatably mounted; a handle hinged to said frame member at each side of and extending upwardly along said shaft; a rack bar hinged to each handle and extending toward the opposite handle; guide rods extending from the free extremities of said rack bars; an eye member pivoted on each handle for receiving the guide rod from the opposite handle to maintain the two rack bars parallel; a gear on said shaft positioned between the rack bars; and a guide frame mounted on said shaft and surrounding said rack bars and said gear to maintain them in intermeshed relation.

7. A hand operated beet topping device comprising: a vertically positioned rotatable shaft; a pointed lower extremity on said shaft; knife arms extending oppositely outward adjacent the pointed extremity of said shaft; means for securing said arms to said shaft; a curved knife blade secured on each knife arm, the curve in said blades positioning their axial extremities at a higher elevation than their peripheral extremities; a frame member in which said shaft is rotatably mounted; a handle hinged to said frame member at each side of and extending upwardly along said shaft; a rack bar hinged to each handle and extending toward the opposite handle; guide rods extending from the free extremities of said rack bars; a gear on said shaft positioned between the rack bars; and a guide frame mounted on said shaft and surrounding said rack bars and said gear to maintain them in intermeshed relation.

8. A beet topping device comprising: a frame member; a vertical bearing in said frame member; a knife shaft extending through said bearing; a gear secured on said knife shaft above said bearing; a handle hinged to said frame member at each side of said bearing, said handles extending upwardly at each side of said gear; a toothed rack bar extending inwardly from each handle; a guide rod extending from each rack bar adjacent the opposite handle; means on the handles for receiving said guide rods to maintain said racks in mesh with said gear; and knives secured on the lower extremity of said shaft so as to rotate therewith.

FRANCIS S. HILL.